United States Patent
Ruffa

[19]

[11] Patent Number: 6,072,928
[45] Date of Patent: Jun. 6, 2000

[54] TOW CABLE WITH CONDUCTING POLYMER JACKET FOR MEASURING THE TEMPERATURE OF A WATER COLUMN

[75] Inventor: Anthony A. Ruffa, Hope Valley, R.I.

[73] Assignee: The United States of America as represented by the Secretary of Navy, Washington, D.C.

[21] Appl. No.: 09/115,073

[22] Filed: Jul. 6, 1998

[51] Int. Cl.[7] .................................................. G02B 6/44
[52] U.S. Cl. .......................... 385/100; 385/101; 385/113
[58] Field of Search ............................ 385/100–114; 250/227.18; 338/22 R; 174/102 R

[56] References Cited

U.S. PATENT DOCUMENTS

| | | | |
|---|---|---|---|
| 4,577,925 | 3/1986 | Winter et al. | 385/100 |
| 5,042,903 | 8/1991 | Jakubowski | 385/101 |
| 5,198,662 | 3/1993 | Yamaguchi et al. | 250/227.18 |
| 5,313,185 | 5/1994 | DeChurch | 338/22 R |
| 5,468,913 | 11/1995 | Seaman et al. | 174/102 R |

*Primary Examiner*—Phan T. H. Palmer
*Attorney, Agent, or Firm*—Michael J. McGowan; Prithvi C. Lall; Michael F. Oglo

[57] ABSTRACT

A tow cable for measuring temperature in a water column comprising an optical fiber core, an electrically conducting polymer jacket concentrically superimposed over the cable core and a temperature sensor embedded in the electrically conducting polymer jacket. The superior heat transfer characteristics of the electrically conducting polymers allow the heat sensors to be embedded directly into the insulating polymer jacket.

18 Claims, 1 Drawing Sheet

TOW CABLE WITH CONDUCTING POLYMER JACKET FOR MEASURING THE TEMPERATURE OF A WATER COLUMN

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to marine tow cables and more particularly to marine tow cables that are used to measure the temperature of a water column.

(2) Description of the Prior Art

Knowledge of the temperature profile of the water column essential to optimize sonar performance. Currently, this information is often obtained through the use of expendable bathythermograph devices. For towed array applications, a continuous measurement could in principle be obtained with temperature sensors distributed along the length of the tow cable. If such a method could reduce the need for expendable bathythermograph devices, significant cost savings could result.

One system for measuring water temperature distribution without the need for such expendable bathythermograph devices is disclosed in U.S. Pat. No. 5,198,662 to Yamaguchi et al. In this system an optical fiber is suspended from a ship and towed by the ship to form an arc within the water. A measuring device for continuously monitoring temperature at various points along the length of the optical cable is provided. Sensors are also provided within the water depth at each of the various points along the length of the arc shaped optical fiber so that a temperature distribution at each water depth can be continuously measured. This patent does not, however, disclose a way for allowing temperature-sensing devices to be efficiently incorporated into the jacket of the cable.

It is known in the prior art that various organic polymers can be doped with electron acceptors and electron donors to achieve conductivity levels approaching those of some metals. Such polymers are known and are referred to herein as "conducting polymers".

Various uses have been suggested for such conducting polymers in electrical and optical fiber cables.

U.S. Pat. No. 5,313,185 to DeChurch, for example, discloses a continuous cable formed of a conducting polymer. The conducting polymer is extruded over a pair of elongated substantially parallel conductors that are spaced along the longitudinal length of the cable. This cable senses high temperatures when the conducting polymer filler melts and closes the circuit between the two conductors.

U.S. Pat. No. 5,382,909 to Massia et al. discloses the use of an electrically conducting polymer jacket for detecting liquid leaks. Two elongated conductors become electrically connected at a location that is determined by the leak, thus creating a system in which the connection point can be located by measuring the potential drop from one end of one of the conductors to the connection point.

While the cables described in the above mentioned DeChurch and Massia et al. patents make use of the electrical characteristics of conducting polymers, heretofore there has been no suggestion of exploiting the superior heat transfer characteristics of conducting polymers in optical fiber cable or electrical cable. A need, therefore, exists for an optical cable measuring water temperature distribution that makes use of the superior heat transfer characteristic of conducting polymers and allows heat sensors to be incorporated into the cable jacket.

SUMMARY OF THE INVENTION

The present invention comprises a tow cable for measuring temperature in a water column comprising an optical fiber cable core which includes an electrically conducting polymer jacket superimposed over the cable core and a temperature sensing means embedded in the electrically conducting polymer jacket.

The high heat conductivity characteristics of the conducting polymers allow for efficient performance even though the temperature sensing means are embedded in the polymer jacket.

Preferably the electrically conducting polymer is concentrically superimposed over the cable core, and a strength increasing member is concentrically interposed between the cable core and the electrically conducting polymer jacket.

The electrically conducting polymer is preferably polyaniline or other conducting polymer that is not soluble in water.

BRIEF DESCRIPTION OF THE DRAWINGS

Other objects, features and advantages of the present invention will become apparent upon reference to the following description of the preferred embodiments and to the drawing, wherein corresponding reference characters indicate corresponding parts in the drawing and wherein.

DESCRIPTION OF THE PREFERRED EMBODIMENT

Figure 1:
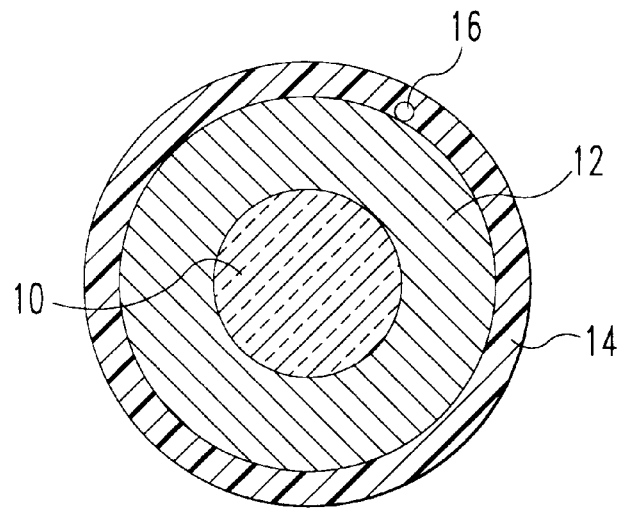
FIG. 1 is a transverse cross sectional view of a tow cable representing a preferred embodiment of the present invention.

Referring to FIG. 1, the tow cable includes a cable core 10, which includes a plurality of axially connected optical fibers. Concentrically superimposed over the cable core 10 there are strength members 12 that are preferably steel braid or KEVLAR fibers. Concentrically overlying the strength members 12 there is an electrically conducting polymer jacket 14. This electrically conducting polymer jacket 14 is preferably comprised of polyaniline, or some other conducting polymer that is not soluble in water or a polymer/metal filing composite. Interposed between the electrically conducting polymer jacket 14 and the strength members 12 there is a temperature sensor 16 which is embedded in an inner peripheral cavity in the electrically insulative polymer jacket 14.

Figure 2:
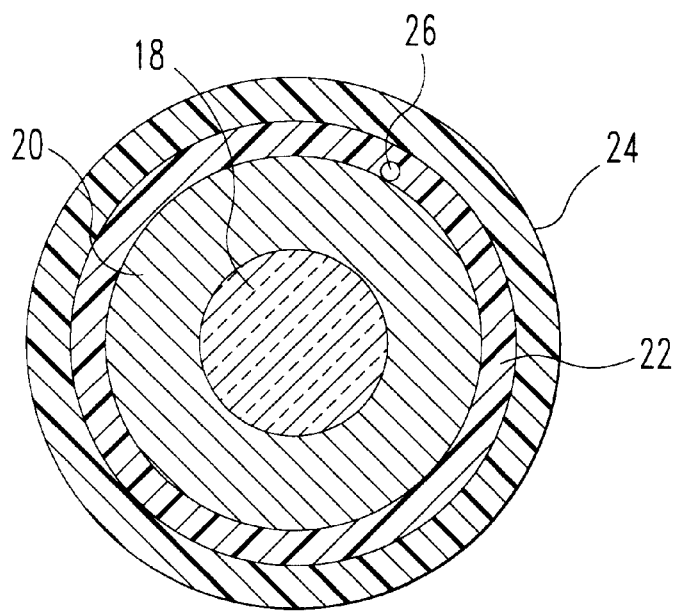
FIG. 2 is a transverse cross sectional view of another tow cable representing an alternate preferred embodiment of the present invention.

Referring to FIG. 2, another tow cable is shown which includes a cable core 18. Concentrically overlying the cable core 18 there are a plurality of strength members 20. Such strength members 20 are preferably steel braid or KEVLAR fibers. Concentrically overlying the strength members 20 there is a conventional polymer jacket 22 that may be high-density polyethylene, polyurethane. Concentrically overlying the conventional polymer jacket 22 there is an electrically conducting polymer jacket 24. This electrically conducting polymer jacket 24 is preferably comprised of polyaniline. Interposed between the conventional polymer jacket 22 and the electrically conducting polymer jacket 24 there is a temperature sensor 26 which is embedded in the electrically conducting polymer jacket 24. In this embodiment, the jacket is doubled extruded. That is, the conventional polymer jacket 22 is extruded. The sensors 26 are then pre-mounted, and the conducting polymer jacket 24 is then extruded.

Preferably this invention involves a tow cable with a jacket made of a conducting polymer with embedded distributed temperature sensors to measure the temperature profile. Conducting polymers are essentially electrolytes, i.e.; they conduct electricity by the movement of ions. Like most materials having good electrical conductivity, conducting polymers also have good thermal conductivity.

The conducting polymer will preferably be an environmentally stable polymer such as, e.g., polyaniline, which is not soluble in water. The conducting polymers can be extruded in conjunction with a suitable polymer binder, e.g., high-density polyethylene, to obtain desired mechanical properties needed in a tow cable jacket.

Such a tow cable would be constructed by embedding the temperature sensors and associated electronics, if any, into a conducting polymer tow cable jacket. First mounting them to the tow cable and then extruding the polymer jacket over cable, sensors, electronics and wires could do this.

The temperature sensing means are preferably fiber optic temperature sensors. An example of a fiber optic temperature sensor might be a short length of optical fiber (perhaps coated with some material to enhance the composite thermal expansion coefficient) and a reference fiber. In practice, two optical fibers could be bonded together. The first fiber would contain the temperature sensor, which is merely a short-coated length at its end, terminated by a reflector. A reflector at the location where the temperature sensor begins would terminate the second fiber. The difference in length between the two fibers would be the length of the temperature sensor, which can be measured with an interferometer and calibrated to yield temperature. Fiber optic temperature sensors should have a very fast thermal response time because of their small diameter. In addition, a bundle of such sensors could easily be extruded into the tow cable jacket to provide a series of distributed temperature sensors along the cable. The good thermal conductivity of the jacket combined with the small diameter of the temperature sensors should minimize the thermal response time associated with temperature measurement. The temperature gradient in the conducting polymer jacket will be small and thus the temperature measured below the surface will be approximately the same as the temperature on the jacket surface at that location.

Ideally, the thermal response time will be small compared to the time associated with significant temperature changes in the water column at a particular depth as the ship advances. Another way to minimize the thermal response time would be to locate the sensor as close as possible to the surface of the cable jacket. This is balanced, however, with the need to protect the sensor from damage.

It will be appreciated that an optical cable measuring system has been described which makes use of the superior heat transfer characteristics of electrically conducting polymers to allow the heat sensors to be embedded directly into the insulative polymer jacket.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A tow cable for measuring temperature in a water column comprising:
   a cable core;
   an electrically conducting polymer jacket superimposed over the cable core; and
   a temperature sensing means embedded in the electrically conducting polymer jacket.

2. The tow cable of claim 1 wherein the electrically conducting polymer jacket is concentrically superimposed over the cable core.

3. The tow cable of claim 1 wherein a strength increasing member is interposed between the cable core and the electrically conducting polymer jacket.

4. The tow cable of claim 3 wherein the strength increasing member is concentrically interposed between the cable core and the electrically conducting polymer jacket.

5. The tow cable of claim 4 wherein the temperature sensing means is interposed between the strength increasing means and the electrically conducting polymer jacket.

6. The tow cable of claim 3 wherein a layer of an electrically insulating polymer is interposed between the strength-increasing member and the electrically conducting jacket.

7. The tow cable of claim 6 wherein the layer of electrically insulating polymer is concentrically interposed between the strength increasing member and the electrically conducting jacket.

8. The tow cable of claim 1 wherein the cable core contains optical fibers.

9. The tow cable of claim 8 wherein the optical fibers are coaxially connected optical fibers.

10. The tow cable of claim 8 wherein the cable core contains optical fibers.

11. The tow cable of claim 10 wherein the optical fibers are coaxially connected.

12. The tow cable of claim 7 wherein the cable core contains optical fibers.

13. The tow cable of claim 12 wherein the optical fibers are coaxially connected.

14. The tow cable of claim 5 wherein the electrically conducting polymer jacket which includes a polymer that is not soluble in water.

15. The tow cable of claim 10 wherein the electrically conducting polymer is a polymer filing composite.

16. The tow cable of claim 12 wherein the electrically conducting polymer jacket is a metal filing composite.

17. The tow cable of claim 1 wherein the electrically conducting polymer is polyaniline.

18. The tow cable of claim 1 wherein the electrically conducting polymer includes a polymeric binder.

* * * * *